United States Patent
Okubo

(10) Patent No.: US 7,729,608 B2
(45) Date of Patent: Jun. 1, 2010

(54) IMAGE PROCESSING METHOD AND IMAGE PROCESSING APPARATUS

(75) Inventor: Takahiro Okubo, Tokyo (JP)

(73) Assignee: Sony Corporation, Tokyo (JP)

( * ) Notice: Subject to any disclaimer, the term of this patent is extended or adjusted under 35 U.S.C. 154(b) by 935 days.

(21) Appl. No.: 11/359,415

(22) Filed: Feb. 23, 2006

(65) Prior Publication Data

US 2006/0200106 A1 Sep. 7, 2006

(30) Foreign Application Priority Data

Mar. 4, 2005 (JP) ............................. 2005-060750

(51) Int. Cl.
*G02B 13/02* (2006.01)

(52) U.S. Cl. ................. 396/374; 348/220.1; 348/333.05

(58) Field of Classification Search ......... 359/665–666, 359/253; 396/287, 373, 374; 348/220.1, 348/333.01, 333.05
See application file for complete search history.

(56) References Cited

U.S. PATENT DOCUMENTS

| | | | | |
|---|---|---|---|---|
| 6,871,010 | B1* | 3/2005 | Taguchi et al. ............... | 386/120 |
| 6,891,679 | B2* | 5/2005 | Atarashi et al. .............. | 359/666 |
| 7,388,705 | B2* | 6/2008 | Onuki et al. ................. | 359/253 |
| 2002/0005909 | A1* | 1/2002 | Sato ............................ | 348/559 |
| 2002/0064387 | A1* | 5/2002 | Miyake et al. ............... | 396/429 |
| 2003/0026594 | A1* | 2/2003 | Shiiyama ..................... | 386/69 |
| 2003/0152263 | A1* | 8/2003 | Kawano et al. .............. | 382/154 |
| 2003/0197785 | A1* | 10/2003 | White et al. ............ | 348/207.99 |
| 2005/0041132 | A1* | 2/2005 | Juen et al. .............. | 348/333.12 |
| 2006/0056041 | A1* | 3/2006 | Kato et al. ................... | 359/665 |

FOREIGN PATENT DOCUMENTS

| | | |
|---|---|---|
| JP | 05-292444 A | 11/1993 |
| JP | 09-284692 A | 10/1997 |
| JP | 10-032734 A | 2/1998 |
| JP | 2001-145057 A | 5/2001 |
| JP | 2002-057937 A | 2/2002 |

OTHER PUBLICATIONS

Japanese Office Action issued Jan. 5, 2010 for corresponding Japanese Application No. 2005-060750.

* cited by examiner

*Primary Examiner*—Jordan M. Schwartz
(74) *Attorney, Agent, or Firm*—Rader, Fishman & Grauer PLLC

(57) ABSTRACT

An image processing method comprising a first step of displaying a moving image being captured on a display and a second step of displaying a still image captured in response to a still image capture instruction on the display simultaneously with the moving image being captured when receiving the still image capture instruction during display of the moving image on the display in the first step and an image processing apparatus using the same.

3 Claims, 9 Drawing Sheets

FIG. 2
FIG. 2A
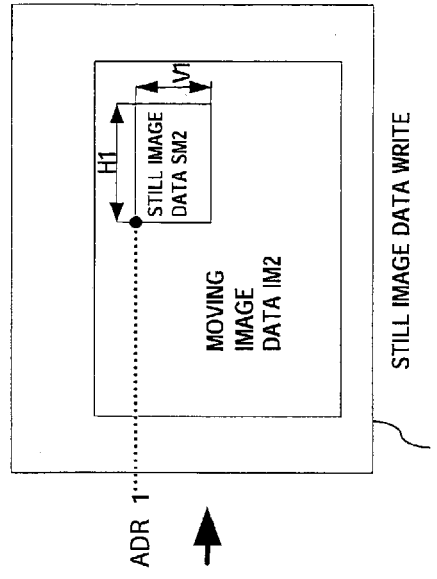
MOVING PICTURE DATA WRITE
FIG. 2B
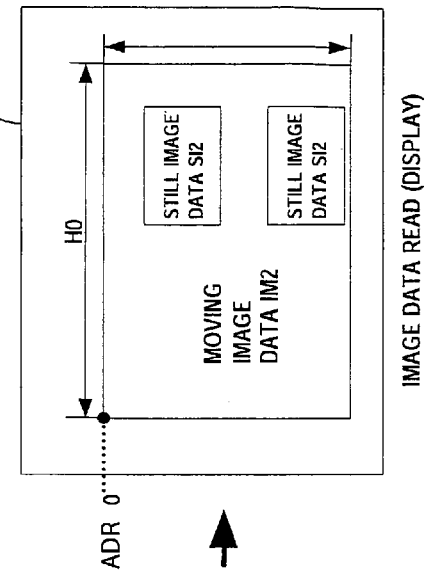
STILL IMAGE DATA WRITE
FIG. 2C
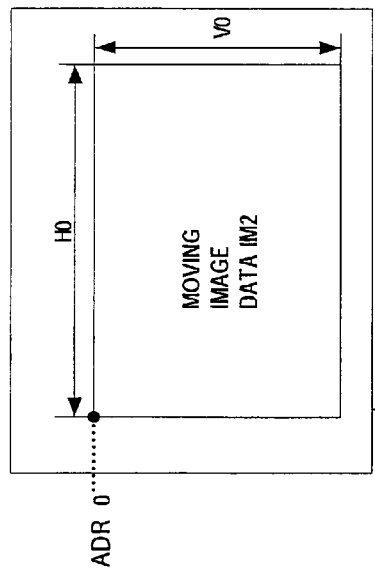
STILL IMAGE DATA WRITE
FIG. 2D
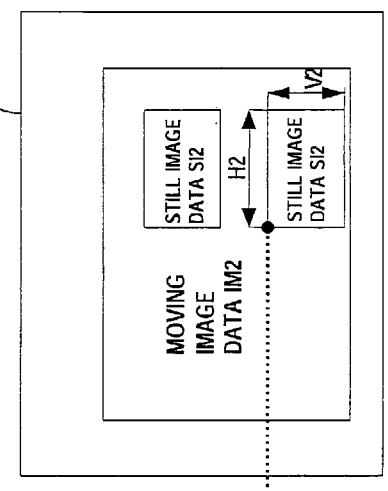
IMAGE DATA READ (DISPLAY)

SUPERPOSITION OF MOVING IMAGE AND STILL IMAGE ON EACH OTHER

FIG. 4
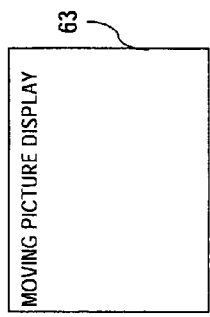
FIG. 4A
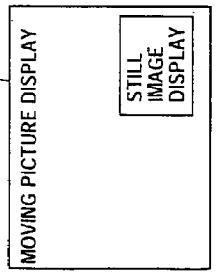
FIG. 4B
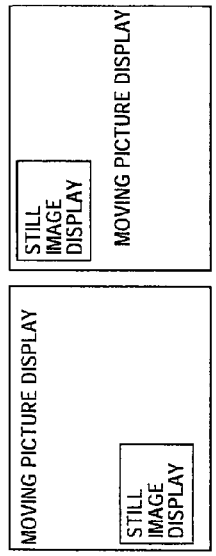
FIG. 4C
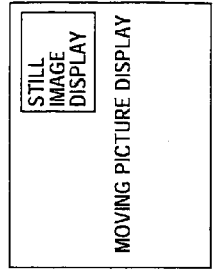
FIG. 4D
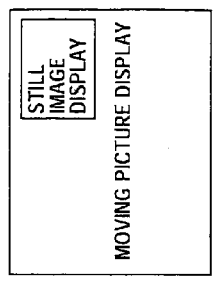
FIG. 4E
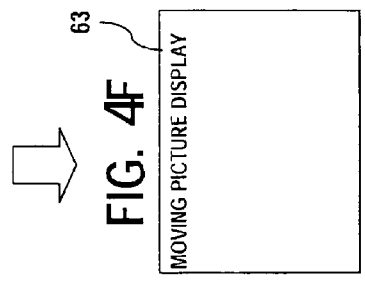
FIG. 4F FIG. 5
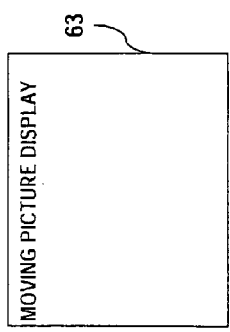
FIG. 5A
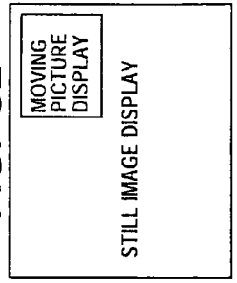
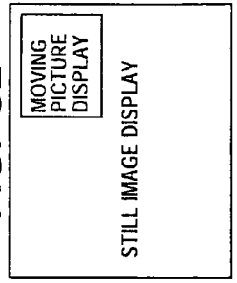
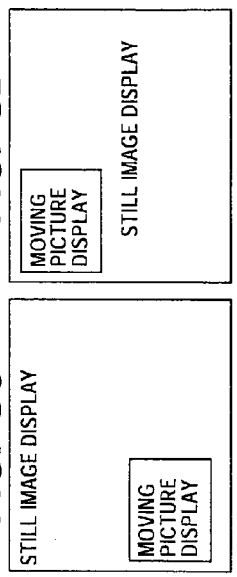
FIG. 5B
FIG. 5C
FIG. 5D
FIG. 5E
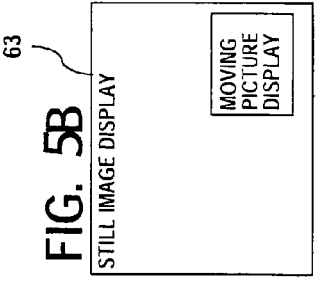
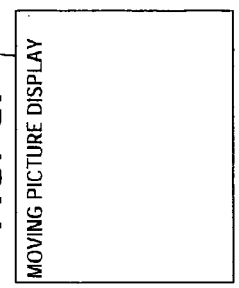
FIG. 5F FIG. 6
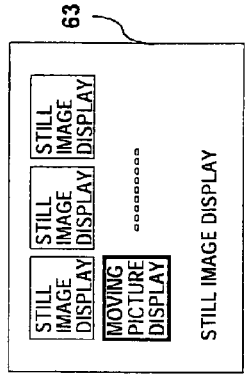
FIG. 6A
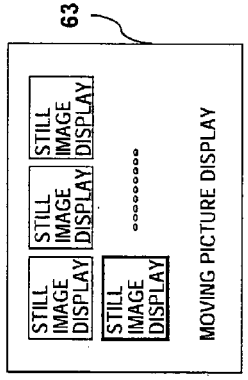
FIG. 6B
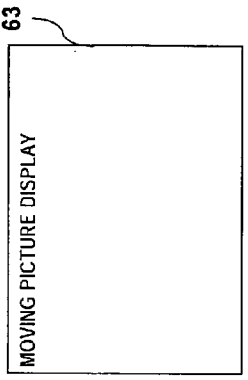
FIG. 6C
FIG. 6D
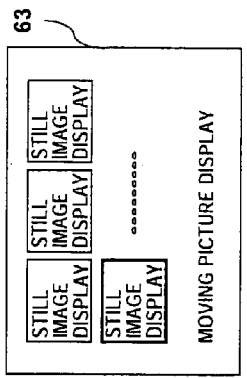
FIG. 6E
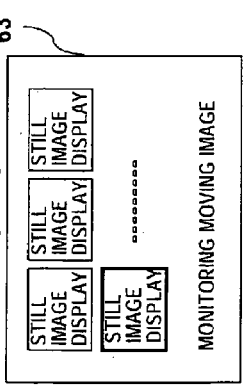
FIG. 6F FIG. 8
FIG. 8A
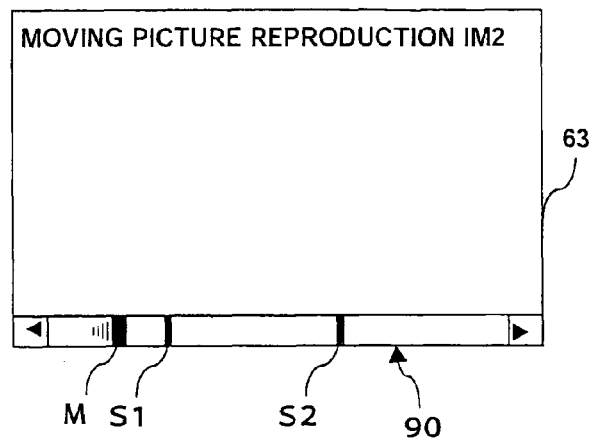
FIG. 8B
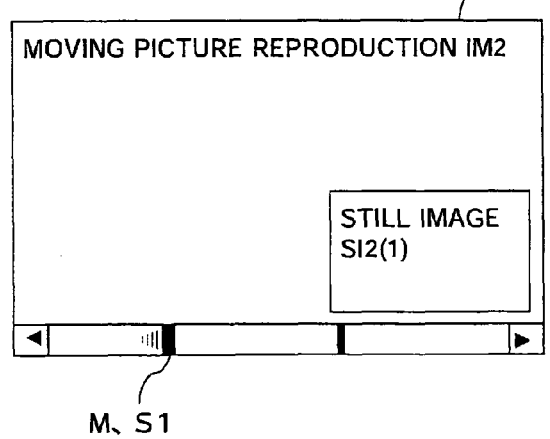
FIG. 8C
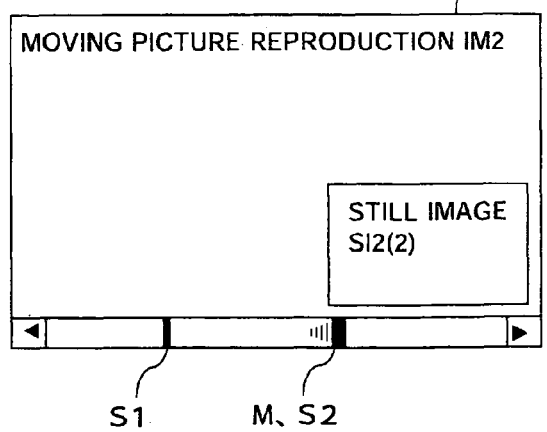

IMAGE PROCESSING METHOD AND IMAGE PROCESSING APPARATUS

CROSS REFERENCES TO RELATED APPLICATIONS

The present invention contains subject matter related to Japanese Patent Application No. 2005-060750filed in the Japan Patent Office on Mar. 4, 2005, the entire contents of which being incorporated herein by reference.

BACKGROUND OF THE INVENTION

1. Field of Invention

The present invention relates to an image processing method and an image processing apparatus for displaying a moving image and a still image being captured.

2. Description of the Art

In the past, an imaging device able to simultaneously capture a moving image and a still image has been proposed. In such an imaging device, it is possible to record an impressive scene as a still image while capturing a moving image without interrupting capture of the moving image. These imaging devices are equipped with liquid crystal panels and other display devices and use these display devices to confirm the subject being captured and confirm the quality of the captured still image. For such related art, see Japanese Patent Publication (A) No. 2003-158684.

When simultaneously capturing a moving image and a still image, however, a conventional imaging device displays only one of the still image and moving image, therefore while capturing a moving image, only the moving image was displayed and the quality of the still image could not be confirmed or conversely only the still image was displayed for a few seconds, so the subject of the moving image could not be confirmed. The performance was therefore felt to be poor. Further, at the time of reproduction, only one of the moving image or the still image was displayed. No attractive method of reproduction making good use of the function of simultaneous recording has yet been proposed.

SUMMARY OF THE INVENTION

An object of the present invention is to provide an image processing method and an image processing apparatus enabling display of a still image captured while capturing a moving image together with the moving image.

Another object of the present invention is to provide an image processing method and an image processing apparatus enabling simultaneous reproduction and display of a moving image and a still image.

According to a first aspect of the present invention, there is provided an image processing method comprising a first step of displaying a moving image being captured on a display and a second step of displaying a still image captured in response to a still image capture instruction on the display simultaneously with the moving image being captured when receiving the still image capture instruction during display of the moving image on the display in the first step.

According to a second aspect of the present invention, there is provided an image processing apparatus for displaying a captured image on a display, comprising an image processing means for displaying a moving image being captured on the display and, when capturing a still image, displaying the captured still image on the display simultaneously with the moving image.

According to a third aspect of the present invention, there is provided an image processing method comprising a first step of reproducing moving image data and still image data and displaying reproduced images on a display; a second step of judging whether or not conditions for displaying the still image data are satisfied during a period when the moving image data is being reproduced and displayed on the display in the first step; and a third step of reproducing the still image data and simultaneously displaying the moving image in accordance with the moving image data and the still image in accordance with the still image data when it is judged in the second step that the conditions are satisfied.

According to a fourth aspect of the present invention, there is provided an image processing apparatus comprising a reproducing means for reproducing moving image data and still image data and displaying reproduced images on a display and an image processing means for making the reproducing means reproduce the still image data when judging that conditions for displaying the still image data are satisfied during a period when the reproducing means is reproducing the moving image data and displaying the same on the display and for making the display simultaneously display the moving image in accordance with the moving image data and the still image in accordance with the still image data on the display.

Summarizing the effects of the invention, according to the present invention, it is possible to provide an image processing method and an image processing apparatus able to display a still image captured while capturing a moving image together with the moving image. Further, according to the present invention, it is possible to provide an image processing method and an image processing apparatus able to simultaneously reproduce and display a moving image and a still image.

BRIEF DESCRIPTION OF THE DRAWINGS

These and other objects and features of the present invention will become clearer from the following description of the preferred embodiments given with reference to the attached drawings, wherein:

FIG. 2 is a diagram for explaining a storage state of a display memory at the time of capture;

FIG. 4 is a diagram for explaining an example of a screen display of the display when capturing a still image during capture of a moving image;

FIG. 5 is a diagram for explaining another example of a screen display of the display when capturing a still image during capture of a moving image;

FIG. 6 is a diagram for explaining still another example of a screen display of the display when capturing a still image during capture of a moving image;

FIG. 8 is a diagram for explaining the screen at the time of a reproduction operation for displaying an image on the display by the imaging device shown in FIG. 1 in a second embodiment of the present invention.

DESCRIPTION OF THE PREFERRED EMBODIMENTS

Below, an imaging device according to preferred embodiments of the present invention will be explained.

<First Embodiment>

Below, a first embodiment of the present invention will be explained.

Figure 1:
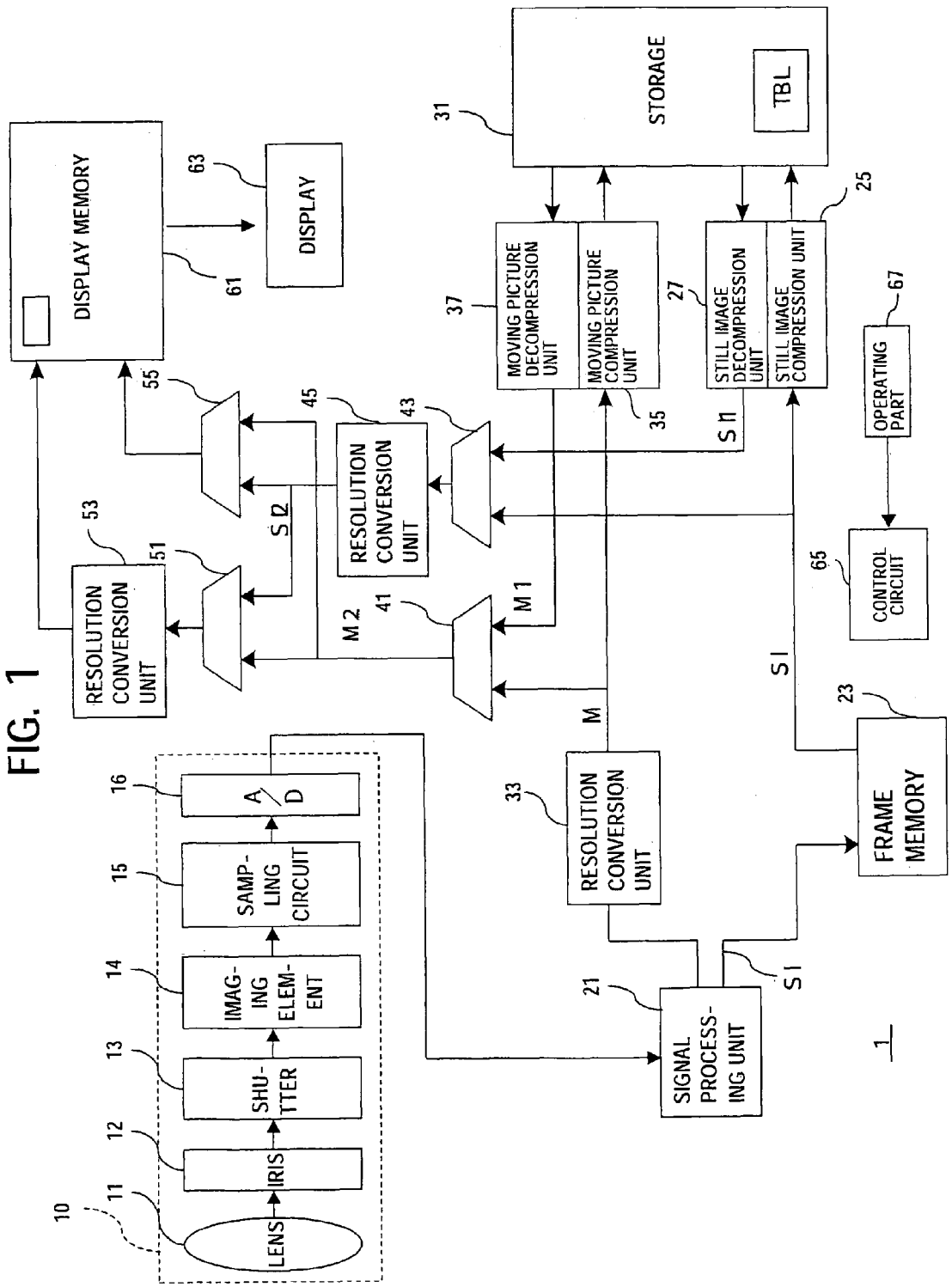
FIG. 1 is a view of the configuration of an imaging device of a first embodiment of the present invention.

FIG. 1 is a view of the overall configuration of an imaging device 1 according to the first embodiment of the present invention. As shown in FIG. 1, the imaging device 1 has for example a camera module 10, signal processing unit 21, frame memory 23, still image compression unit 25, still image decompression unit 27, storage 31, resolution conversion unit 33, moving picture compression unit 35, moving picture decompression unit 37, selector 41, selector 43, resolution conversion unit 45, selector 51, resolution conversion unit 53, selector 55, display memory 61, display 63, control circuit 65, and operating part 67. The configuration of the imaging device 1 may be realized by an electronic circuit or may be realized by a control circuit or other processing circuit running a program as well.

In the imaging device 1 shown in FIG. 1, during capture of a moving image by the camera module 10, the moving image data is sequentially written into the display memory 61. Then, when a user operates the operating part 67 to operate a still image shutter button, the still image data captured by the camera module 10 is written in the display memory 61. The moving image data and the still image data generated in the camera module 10 are converted to thumbnail images at the resolution conversion unit 53 in accordance with the setting of the user and then written into the display memory.61.

Camera Module 10:

The camera module 10 has for example a lens 11, an iris 12, a shutter 13, an imaging element 14, a sampling circuit 15, and an A/D conversion circuit 16. The lens 11 receives light from an imaging target and emits the light to the iris 12. The iris 12 condenses the light incident from the lens 11 and emits it to the shutter 13. The shutter 13 opens for exactly a predetermined time (shutter time) under the control of a not shown exposure control unit. The shutter 13 focuses the light incident from the iris 12 onto the imaging element 14 at the time of opening.

The imaging element 14 is configured by using a charge coupled device (CCD), a complementary metal oxide semiconductor (CMOS) device, etc. and focuses (receives) the light of the subject incident via the shutter 13. The imaging element 14 converts the amounts of light arriving at the light receiving elements on the imaging plane to an electric signal by photoelectric conversion and outputs the converted image signal to the sampling circuit 15. The imaging element 14 is for example a single plate sensor, while the electric signal output to the sampling circuit 15 is a color signal (data) of one of the R signal, G signal, and B signal per pixel.

The sampling circuit 15 removes the noise component from the image signal (electric signal) supplied from the imaging element 14 by for example correlated double sampling and supplies the result to the A/D conversion circuit 16. The A/D conversion circuit 16 performs A/D conversion, that is, sampling and quantization, on the image signal input from the sampling circuit 15. Thereafter, the A/D conversion circuit 16 multiplies the dark image resulting from less than proper exposure, that is, the image data after the A/D conversion, by a built-in shift circuit by Mk by shifting it by for example n bits to thereby convert it (increase it in gain) to image data having the same brightness (value) as that by the proper exposure.

The signal processing unit 21 processes the image data input from the A/D conversion circuit 16 to generate still image data (frame data) SI. The signal processing unit 21 writes the generated still image data SI into the frame memory 23. Further, the signal processing unit 21 outputs the generated still image data SI to the resolution conversion unit 33.

The still image compression unit 25 performs reversible compression or irreversible compression on the still image data SI read out from the frame memory 23 and writes the result into the storage 31. The still image decompression unit 27 decompresses the compressed still image data read out from the storage 31 to generate still image data SI1 and outputs this to the selector 43. In the present embodiment, the still image compression unit 25 and the still image decompression unit 27 perform compression/decompression by for example the JPEG (Joint Photographic Experts Group) standard.

The storage 31 is a for example flash memory or hard disk or other storage medium. The resolution conversion unit 33 converts the still image data SI input from the signal processing unit 21 to HD (high definition) size or SD (standard definition) size moving image data IM. The resolution conversion unit 33 outputs the moving image data IM to the moving picture compression unit 35 and the selector 41.

The moving picture compression unit 35 performs reversible compression or irreversible compression on the moving image data IM input from the resolution conversion unit 33 and writes the result into the storage 31. The moving picture decompression unit 37 decompresses the compressed moving image data read out from the storage 31 to generate the moving image data IM1 and outputs this to the selector 41. In the present embodiment, the moving picture compression unit 35 and the moving picture decompression unit 37 perform the compression and decompression by for example the MPEG (Moving Picture Experts Group) standard.

The selector 41 selects either of the moving image data IM from the resolution conversion unit 33 or the moving image data IM1 from the moving picture decompression unit 37 based on a control signal from the control circuit 65 and outputs it as moving image data IM2 to the selector 51. The selector 41 sometimes does not select either of the moving image data IM or IM1 according to any control signal. The selector 43 selects either the still image data SI read out from the frame memory 23 or the still image data SI1 input from the still image decompression unit 27 and outputs it to the resolution conversion unit 45. The selector 43 sometimes does not select either of the still image data SI or SI1 according to any control signal.

The resolution conversion unit 45 converts the still image data input from the selector 43 to the HD size or SD size to generate still image data SI2 and outputs this to the selector 51 and the selector 55. The selector 51 selects either of the moving image data IM2 input from the selector 41 or the still image data SI2 input from the resolution conversion unit 45 based on the control signal from the control circuit 65 and outputs it to the resolution conversion unit 53. Note that the selector 51 sometimes does not select either the moving image data IM2 or the still image data SI2 according to any control signal. The resolution conversion unit 53 converts the moving image data IM2 or the still image data SI2 input from the selector 51 to a thumbnail size and writes it into the display memory 61.

The selector 55 selects either of the moving image data IM2 input from the selector 41 or the still image data SI2 input from the resolution conversion unit 45 based on the control signal from the control circuit 65 and writes it into the display memory 61. Note that the selector 55 sometimes does not select either of the moving image data IM2 or the still image data 512 according to any control signal.

The display memory 61 writes the image data output from the selector 51 and the image data output from the selector 55 at predetermined addresses under the control of the control circuit 65. The image (screen) in accordance with the image data stored in the display memory 61 is output to the display 63 for display. In the display memory 61, for example the image data (moving image data or still image data) output from the selector 55 is written as a master screen, and the image data (moving image data or still image data) output from the selector 51 is written as a slave screen.

The control circuit 65 centrally controls components of the imaging device 1 shown in FIG. 1 according to a program stored in a not shown memory. The control circuit 65 outputs control signals to components of the imaging device 1 to control the operation of the imaging device 1 shown below. The operating part 67 is an operating means such as a still image shutter button or a moving picture recording instruction button. The operating part 67 is operated by the user and outputs an operation signal in response to the operation to the control circuit 65. The control circuit 65 performs various processings based on the operation signal from the operating part 67.

In the imaging device 1, under the control of the control circuit 65, the image data of the slave screen is written over the image data of the master screen in the display memory 61. Due to this, the slave screen can be superposed over the master screen in the display. As the method of superposing the slave screen over the master screen, for example, as explained above, any address area, of the master screen arranged in the display memory 61 is overwritten and superposed with the data of the slave screen by the control circuit 65. In this case, the control circuit 65, as shown in FIG. 2A, writes the moving image data IM2 forming the master screen selected at the selector 55 into the display memory 61 based on information of a horizontal direction size (H0), a vertical direction size (V0), and a write head address (ADR0). Thereafter, the control circuit 65 can overwrite the still image data SM2 forming the slave screen selected at the selector 51 in the memory area of the moving image data IM2 explained above for several displays as shown in FIG. 2B and FIG. 2C by the same method so as to prepare one frame data in which the master screen and the slave screen overlap. By sequentially reading out this frame data as one image from the display memory 61 to the display 63 as shown in FIG. 2D, an image having the moving image and the still image overlapped can be displayed.

Figure 3:
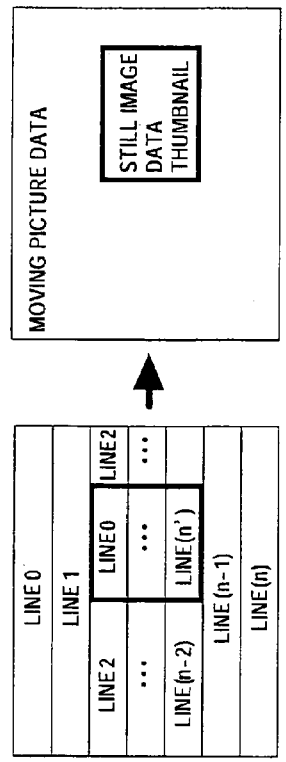
FIG. 3 is a diagram for explaining a modification of the storage state of the display memory shown in FIG. 2.
Figure 3:
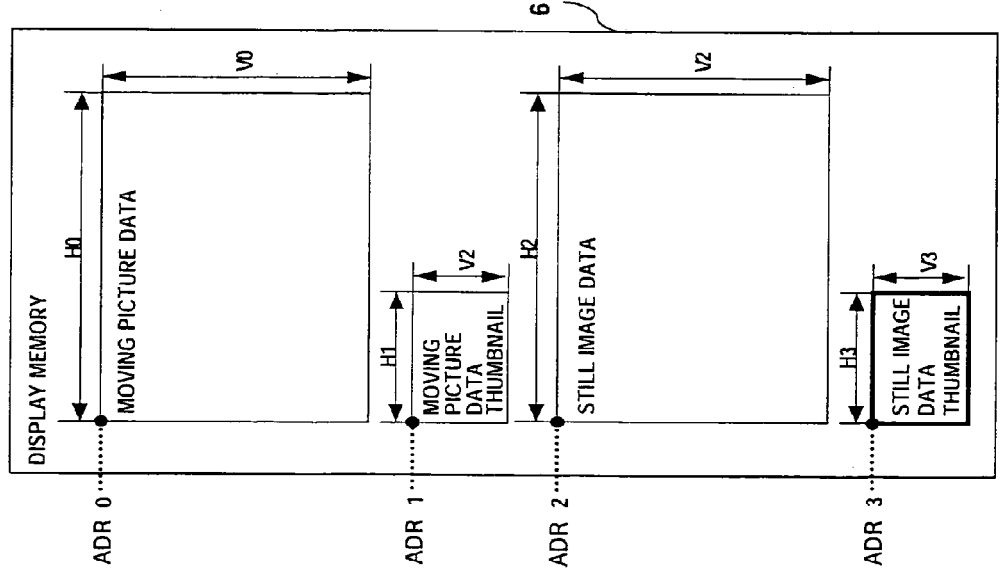

As another example, the control circuit 65 sequentially switches selectors 41, 43, 51, and 55 shown in FIG. 1 as shown in FIG. 3A and writes the still image data and the moving image data as the master screen and the slave screen in different memory areas of the display memory 61 by using the thumbnail processing by the resolution conversion unit 53. Thereafter, the control circuit 65 controls the read address of the image data from the display memory 61 as shown in FIG. 3B based on the horizontal direction size (H0), vertical direction size (V0), and write head address information of each of the master image and the slave image and blends images for each line to thus display an image in which the moving image and the still image overlap as shown in FIG. 3C.

Below, an explanation will be given on an example of a screen display of the display 63 at the time of the imaging of the moving image of the imaging device 1. First, the imaging device 1 displays the moving image in accordance with the moving image data during imaging as shown in FIG. 4A under the control of the control circuit 65. In this state, when the user operates the operating part 67 to operate the still image shutter button to input a still image capture instruction, the control circuit 65 displays the still image captured at a timing of inputting the still image capture instruction on the display 63 as the slave screen as shown in FIG. 4B. Here, it is possible for the user to select any display position and size of the slave screen and display and the image at positions of for example FIG. 4B to FIG. 4E.

The control circuit 65 erases the display of the slave screen as shown in FIG. 4F when a certain time passes after displaying the still image as the slave screen.

Further, the control circuit 65 can freely control the assignment of master/slave screens to the moving image and still image. For example, as shown in FIG. 5A, when a still image capture instruction is input during the display of a moving image on the display 63, the control circuit 65 can display the moving image which had been displayed as the slave screen as shown in any of FIG. 5B to FIG. 5E and can display the entire captured still image as the master screen as well. In this case as well, it is possible for the user to select any position and size of the slave screen. Further, it is possible to freely select the time until the screen display returns to an original display as shown in FIG. 5F.

Further, when the still image capture instruction is input in a continuous imaging mode, the control circuit 65 sequentially displays continuously captured plurality of still images as slave screens one after another as shown in FIG. 6B during the display of the moving image shown in FIG. 6A as the master screen. At this time, the control circuit 65 determines the arrangement of slave screens in accordance with the content optionally set up by the user. The control circuit 65 can arrange slave screens in sequence for example from the top left toward the bottom right of the screen of the display 63 or arrange them in a clockwise direction along an outer frame of the master screen as shown in FIG. 6B. Further, the control circuit 65 may select the displayed slave screen so as to switch the still image in the slave screen and the moving image in the master screen to display images on the display 63 as well as shown in FIG. 6C and FIG. 6D. When a certain time passes, the control circuit 65 displays an original image as shown in FIG. 6E. Further, the control circuit 65 can simultaneously display a monitoring image and the still image by the above method in the same way as the moving image even during monitoring other than the time of capture of the moving picture. Due to this, as shown in FIG. 6F, it becomes possible to capture the image while confirming the subject by the display device even during continuous capture.

Figure 7:
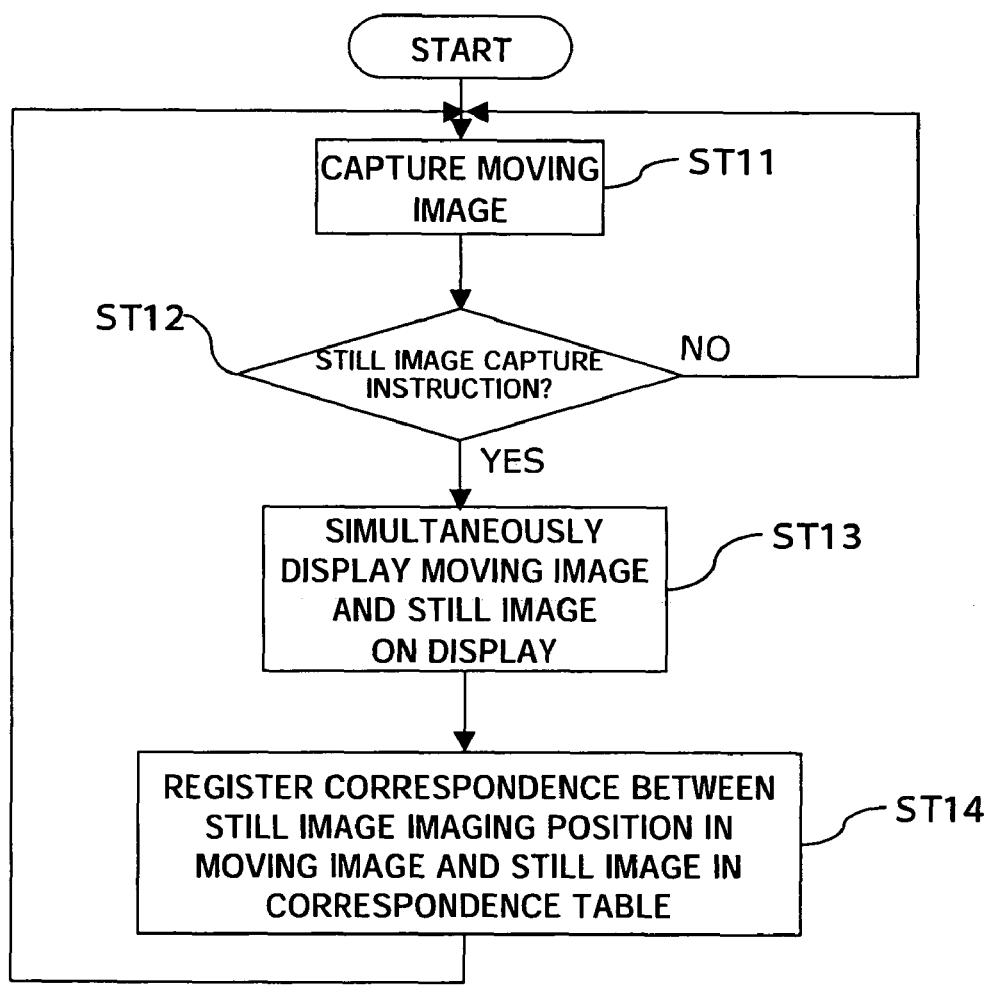
FIG. 7 is a flowchart for explaining an example of operation at the time of the capture of the imaging device shown in FIG. 1.

Below, an example of the operation of the imaging device 1 will be explained. In this example of operation, the explanation will be given of a case where a still image capture instruction is input during capture of the moving image. FIG. 7 is a flowchart for explaining the example of operation. Below, the steps shown in FIG. 7 will be explained.

Step ST11:

The control circuit 65 for example outputs still image data SI captured by the camera module 10 and generated by the signal processing unit 21 to the resolution conversion unit 33 in response to a moving picture recording instruction from the operating part 67. The resolution conversion unit 33 converts the resolution of the still image data SI to generate the moving image data IN and outputs this to the moving picture compression unit 35 and the selector 41. The moving picture compression unit 35 compresses the moving image data IM and writes it into the storage 31. Further, the selectors 41 and 55 select the moving image data IM2 and write it for the master screen into the display memory 61. Due to this, the display 63 displays a moving image in accordance with the moving image data as the master screen during capture.

Step ST12:

The control circuit 65 judges whether or not the still image shutter button was operated, that is, a still image capture instruction was input, based on the operation signal from the operating part 67, proceeds to step ST13 when judging that the instruction was input, and returns to step ST11 when it was not input.

Step ST13:

The control circuit 65 reads out the still image data SI captured by the camera module 10 and generated by the signal processing unit 21 from the frame memory 23 and makes the selector 43 select it at a timing when the still image shutter button was operated. The resolution conversion unit 45 converts the size of the still image data SI input from the selector 43 to generate the still image data SI2 and outputs this to the selector 51. The selector 51 selects the still image data SI2 and outputs it to the resolution conversion unit 53. The resolution conversion unit 53 converts the still image data 512 to a thumbnail and writes it into the display memory 61 as the slave screen. At this time, in the display memory 61, the still image data IS2 is written over the moving image data IM2. Further, at this time, the control circuit 65 performs processing for writing the moving image data IM2 during capture into the display memory 61 and processing for writing the moving image data IM into the storage 31 parallel to the above processing. Further, the control circuit 65 performs processing for writing the captured still image data SI into the storage 31.

Step ST14:

The control circuit 65 specifies the position at which the above still image shutter button was operated in the moving image data IM (or timing or still image data) and adds the correspondence between the timing and the captured still image data SI to the predetermined management table data TBL. In the present embodiment, the management table data TBL is stored in the frame memory 23 or the storage 31.

As explained above, according to the imaging device 1, when capturing a still image during capture of the moving picture, the captured still image can be automatically displayed on the display 63 simultaneously with the moving image. Due to this, the user can confirm the captured still image while confirming the moving picture during capture without performing an operation for switching the screen by himself. For this reason, according to the imaging device 1, since it is possible to simultaneously confirm the moving image being captured and confirm the quality of a plurality of captured still images, it becomes possible to prevent mistaken capture of moving images and erase poorly captured still images before storing them in the storage. Further, according to the imaging device 1, as shown in FIG. 6, it is possible to simultaneously display a image during monitoring and a plurality of still images, therefore it becomes possible to track a subject having motion by the display device for capture even at the time of continuous capture of still images, therefore mistakes in capture of still images can be suppressed. Further, according to the imaging device 1, it is easy to intuitively learn of the capture of a still image during capture of a moving picture by the master/slave screen display, so errors in operation by the user can be suppressed. Further, according to the imaging device 1, a moving image and a still image can be stored linked together, therefore management after capture is easy.

<Second Embodiment>

In the above embodiment, the operation of the imaging device 1 during capture of a moving image was explained. In the present embodiment, the operation of the imaging device 1 at the time of the reproduction of the moving image data and the still image data recorded in the storage 31 will be explained. As explained at step ST14 shown in FIG. 7 of the first embodiment explained above, when the imaging device 1 captures a still image while recording a moving image, the control circuit 65 specifies the position at which the still image shutter button was operated in the moving image data IM and adds the correspondence between the timing and the captured still image data SI to the predetermined management table data TBL. The imaging device 1 automatically reproduces the still image data during the reproduction of the moving image data and displays the same on the display 63 based on the management table data TBL. For example, the control circuit 65 shown in FIG. 1 displays a time bar image 90 during the display of the moving image data IM2 as the master screen as shown in FIG. 8. The time bar image 90 includes for example a current timing instruction image M indicating the timing during reproduction in the entire reproduction time of the moving image data IM2 during reproduction by using the lateral direction in FIG. 8 as a time axis. Further, the time bar image 90 includes still image timing instruction images S1, S2, - indicating at which position (timing) in the moving image data IM2 the still image data SI was captured. In the example of FIG. 8, during the recording of the moving image data IM2, two still image data SI are captured. The timings of capture are displayed by still image timing instruction images S1 and S2.

The user can easily specify at which timing with respect to the present reproduction timing of the moving image data the still image data was recorded by viewing the screen of FIG. 8 displayed on the display 63.

Figure 9:
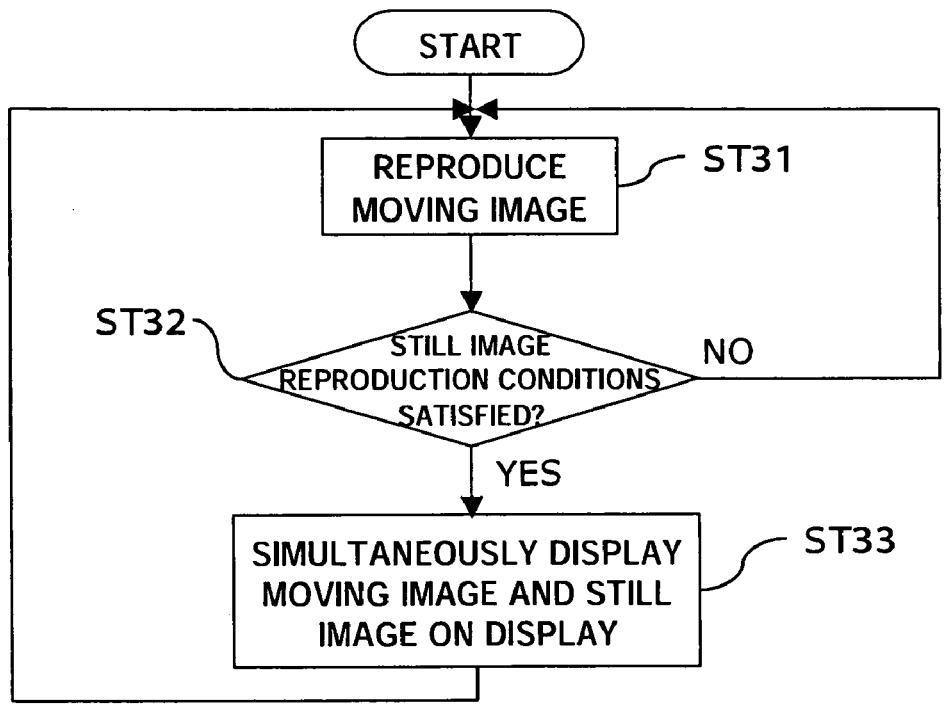
FIG. 9 is a flowchart for explaining the reproduction operation of the imaging device shown in FIG. 1 in the second embodiment of the present invention.

Below, an example of the operation of the imaging device 1 shown in FIG. 1 simultaneously reproducing the moving image data IM and the still image data SI recorded in the storage 31 will be explained. FIG. 9 is a flowchart for explaining the example of operation. Below, an explanation will be given of the steps shown in FIG. 9.

Step ST31:

The control circuit 65 reads out the moving image data from the storage 31 to the moving picture decompression unit 37. The moving picture decompression unit 37 decompresses the moving image data to generate the moving image data IM1 and outputs this to the selector 41. Thereafter, the selector 41 and the selector 55 select the moving image data IM2 (IM1), the moving image data IM2 is written into the display memory 61, and the moving image is displayed on the display 63 as the master screen.

Step ST32:

The control circuit 65 judges whether or not there is still image data corresponding to the timing of reproduction of the moving image data performed at step ST31 based on the management table data TBL read out from the frame memory 23 or the storage 31. The control circuit 65 proceeds to step ST33 when judging that there is still image data, while returns to step ST31 when not judging so.

The control circuit 65 specifies the still image data linked with the timing during reproduction of moving image data based on the management table data TBL and reads out the still image data from the storage 31 to the still image decompression unit 27 based on the management table data TBL. The still image decompression unit 27 decompresses the read out still image data to generate the still image data SI1 and outputs this to the selector 43. The selector 43 selects the still image data SI1 and outputs it to the resolution conversion unit 53. The resolution conversion unit 45 converts the size of the still image data SI1 to generate the still image data SI2 and outputs this to the selector 51. The selector 51 selects the still image data SI2 and outputs this to the resolution conversion unit 53. The resolution conversion unit 53 generates a thumbnail image of the still image data SI2, writes it as a slave screen over the moving image data, and writes the same into the display memory 61. Due to this, as shown in FIG. 8B and FIG. 8C, the moving image during reproduction is displayed as the master screen, and the still image of the reproduction timing is displayed as the slave screen.

In the screen display shown in FIG. 8, the display position, size, and display time of the slave screen can be freely set by the user. Further, for example, as the moving image and still image shown in FIG. 8, the control circuit 65 may display both the moving image and still image during reproduction as slave screens or display a still image as a master screen and display a moving image as a slave screen at the display timings of the still image.

As explained above, according to the imaging device 1, during the reproduction of a moving image, a still image captured linked with the moving image of the reproduction timing can be automatically displayed on the slave screen. Due to this, according to the imaging device 1, it becomes possible to reproduce a moving image and a still image by a link, so an attractive reproduction method not seen in the past becomes possible.

The present invention is not limited to the above embodiments. It should be understood by those skilled in the art that various modifications, combinations, sub- combinations and alterations may occur depending on design requirements and other factors insofar as they are within the scope of the appended claims or the equivalents thereof.

For example, the display screen of the imaging device 1 explained in the present embodiment is an example. The invention is not particularly limited so far as it can simultaneously display a moving image and a still image at the time of capture or reproduction of a still image.

What is claimed is:

1. An image processing apparatus comprising
a reproducing means for reproducing moving image data and still image data and displaying reproduced images on a display and
an image processing means for making the reproducing means reproduce the still image data when judging that conditions for displaying the still image data are satisfied during a period when the reproducing means is reproducing the moving image data and displaying the same on the display and for making the display simultaneously display the moving image in accordance with the moving image data and the still image in accordance with the still image data on the display,
wherein said image processing means uses management data linking a predetermined position in said moving image data and said still image data so as to display a still image corresponding to said still image data linked with said predetermined position on said display at the same time as said moving image at a timing at which said predetermined position of said moving image data is reproduced.

2. An image processing apparatus as set forth in claim 1, wherein said image processing means uses said management data so as to display a guide image showing a positional relationship between a reproduction position during reproduction of said moving image data and said predetermined position on said display.

3. An image processing apparatus as set forth in claim 1, wherein said image processing means
reduces said moving image data to generate reduced moving image data, reduces said still image data to generated reduced still image data, and writes said moving image data, said still image data, said reduced moving image data, and said reduced still image data in a display memory and
controls the address for reading from said display memory at the time of display on said display so as to perform any of first display processing for simultaneously displaying on said display a moving image corresponding to said moving image data and a reduced still image corresponding to said reduced still image data, second display processing for simultaneously displaying on said display a reduced moving image corresponding to said reduced moving image data and a reduced still image corresponding to said reduced still image data and third display processing for simultaneously displaying on said display a still image corresponding to said still image data and a reduced moving image corresponding to said reduced moving image data.

* * * * *